INVENTOR.
RICHARD M. SMOLL
BY John H. Widdowson
ATTORNEY

Nov. 21, 1967  R. M. SMOLL  3,353,638

FLUID PRESSURE CLUTCH MEANS ASSEMBLY

Filed May 10, 1965  2 Sheets-Sheet 2

INVENTOR.
RICHARD M. SMOLL
BY
*John H. Widdowson*
ATTORNEY

United States Patent Office 3,353,638
Patented Nov. 21, 1967

3,353,638
FLUID PRESSURE CLUTCH MEANS ASSEMBLY
Richard M. Smoll, P.O. Box 822, Wichita, Kans. 67201
Filed May 10, 1965, Ser. No. 454,549
2 Claims. (Cl. 192—3.5)

ABSTRACT OF THE DISCLOSURE

The invention concerns a clutch operated by fluid pressure in cooperative combination with a drive mechanism off-set from the clutch. The clutch mechanism of the assembly is mounted within a housing. An inside part of the housing is rigidly mounted around the power in-put shaft, such being rotatable in respect to the housing. The clutch shaft is keyed or otherwise connected to this power in-put shaft. It is rigidly mounted on the power in-put shaft. The clutch shaft has a pressure fluid conduit therein and axially positioned splines around the outside thereof. A pressure fluid in-put shaft is suitably connected to the clutch shaft and has a pressure fluid conduit therein. The clutch operates by friction with the friction clutch element mounted on the clutch shaft and engaging the splines of the clutch shaft. The clutch has a thrust element which normally urges the clutch into released position. A chamber is provided with the clutch for expanding the pressure operated fluid thereinto. The power is taken from the clutch assembly by a rotating power out-put element which has a geared pulley turnably mounted on the clutch shaft. A duct interconnects through the clutch shaft to in operation deliver pressure fluid into the chamber to result in engaging the rotatable power out-put element and turning same. A geared pulley is mounted on a rotatable power out-put shaft. This power out-put shaft is turnably mounted in the clutch housing. A geared chain or the like connects in driving relation the geared pulleys. The outside portion of the housing is connected to the inside part of the housing.

This invention relates to a fluid pressure clutch assembly, and more particularly this invention relates to a fluid pressure operated clutch in combination with an off-set drive mechanism mounted in a housing.

Various types of fluid pressure clutch drive mechanisms are known in the prior art. However, in situations where space is limited mechanisms now in use are not practical or usable in many instances due to their size or shafting and gearing arrangement. Difficulties have been encountered in prior art mechanisms in introducing air or other pressure fluid into the pressure fluid chamber of the clutch mechanism, more particularly where the power out-put shaft is in tandem with the clutch mechanism and power in-put shaft. In such arrangements it is often necessary to have separate air hoses or other pressure fluid delivery means to deliver air to the clutch. Also, in tandem installations it is impossible to effect any change in gear ratio from the power source to power out-put except by a separate gearing arrangement which is expensive to produce and difficult or impossible to install particularly where space is limited.

In accordance with the present invention the new fluid pressure operated clutch with off-set drive mechanism has a housing with power in-put shaft means mounted in the housing, the shaft means having means to connect same to a power source. The shaft means has a clutch means mounted thereon, with the shaft means having means to deliver fluid under pressure to operate the clutch means. A power out-put shaft means is mounted in the housing spaced from the power in-put shaft. Connecting means drivingly connect the power out-put shaft means and the clutch means.

The fluid pressure clutch of the invention has a housing with shaft means mounted in the housing having means to connect same to a power source. The shaft means has fluid operated clutch means mounted on it, with the shaft means having means to deliver fluid under pressure to operate the clutch means. The shaft means has means constructed and adapted to deliver power where the clutch means are engaged.

The new type fluid pressure clutch means assembly of my invention which has been provided, overcomes the disadvantages of the prior art devices; more specifically my invention allows the utilization of a fluid pressure operated clutch in many installations and in a wide variety of conditions where it was heretofore impossible to utilize such a clutch mechanism. The introduction of the pressure fluid or air is accomplished through ducts in the shafting arrangement which communicate directly to the clutch mechanism, thus doing away with air hoses and piping and the like which are necessary in other types of clutch arrangements. The off-set drive arrangement of my invention allows the use of a fluid pressure clutch where only additional lateral space is available. This arrangement also provides for easy installation or repair when necessary. My invention also overcomes a disadvantage in the prior art in that a speed change can be easily and readily obtained by the installation of different sized gears, pulleys or chain sprocket wheels on the in-put shaft and the out-put shaft. The housing which preferably encloses my invention provides for a compact dirt-free unit which is economical to build, easy to install and easily adapted to many requirements.

Accordingly it is an object of this invention to provide a new and improved fluid pressure clutch means assembly.

Another object of this invention is to provide a compact fluid pressure clutch means.

Yet another object of this invention is to provide a fluid pressure driven clutch combined with an off-set drive mechanism.

Still another object of this invention is to provide a fluid pressure clutch that has fluid pressure ducts within its shafting arrangement.

A further object of this invention is to provide a fluid pressure clutch combination with an off-set drive mechanism in which various gear ratios are obtainable.

Still a further object of this invention is to provide a pressure fluid operated clutch in combination with an off-set drive which can utilize various types of optional driving mechanisms.

Another object of this invention is to provide an off-set drive mechanism where intermittent use of the power supply is desirable.

Yet another object of this invention is to provide a compact fluid pressure clutch with off-set drive mechanism where only lateral space is available.

Various other objects and advantages and features of the invention will become apparent to those skilled in the art from reading this disclosure.

Drawings accompany and are a part of this disclosure. These drawings depict preferred specific embodiments of the fluid pressure clutch means assembly of the invention, and it is to be understood that these drawings are not to unduly limit the scope of the invention. In the drawings, FIG. 1 is an elevation view partly in cross section through the clutch assembly and off-set drive mechanism.

Figure 1:
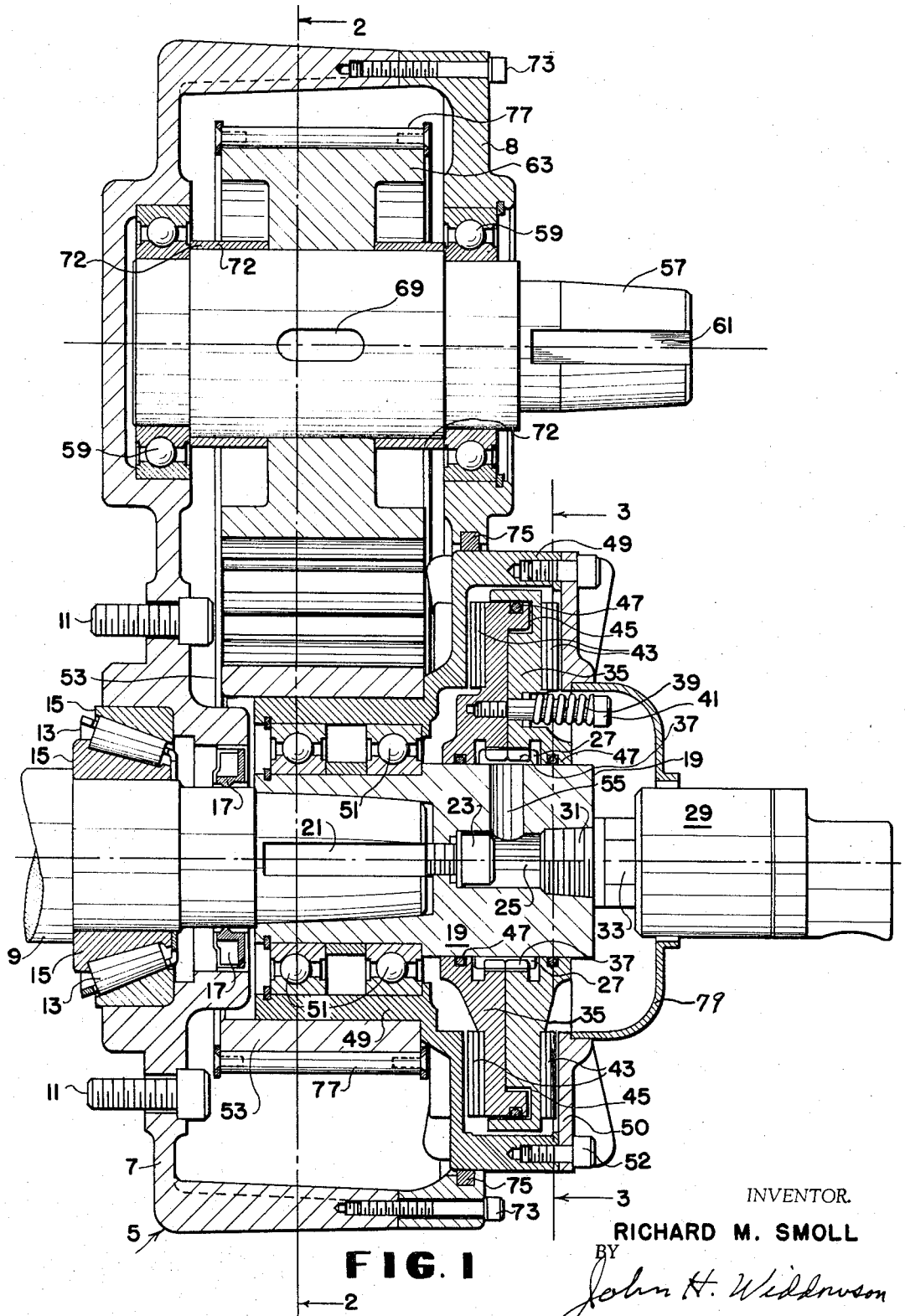
Figure 2:
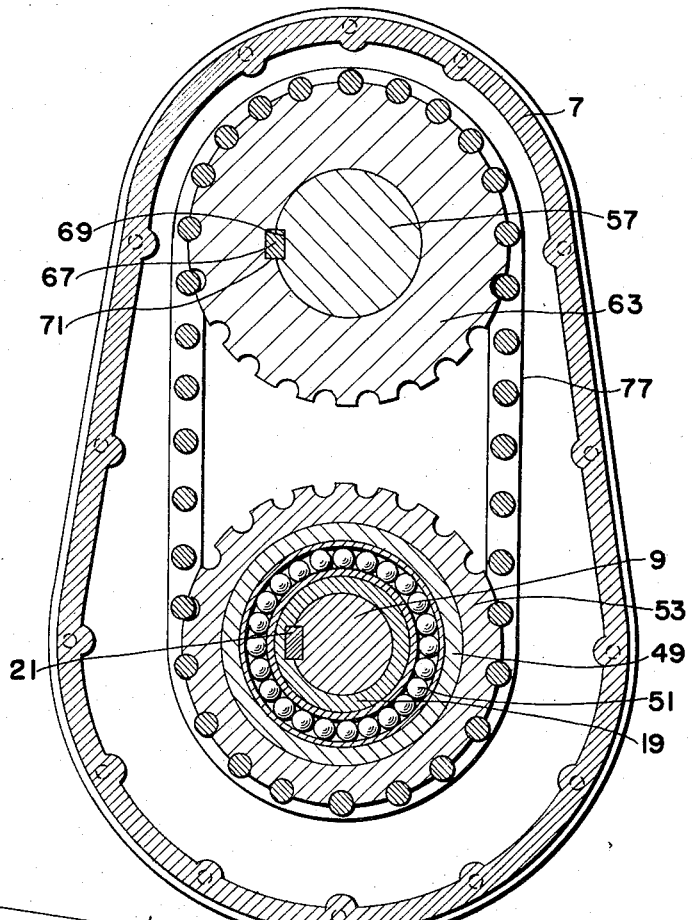
FIG. 2 is a cross section view taken along line 2—2 of FIG. 1.
Figure 3:
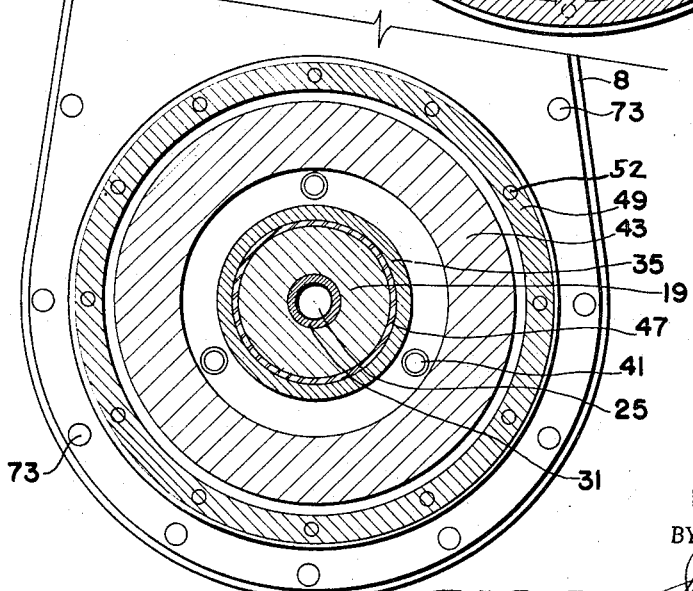
FIG. 3 is a cross section view taken along line 3—3 of FIG. 1.

In the following is a discussion and description made with reference to the drawings whereon the same reference numerals are used to indicate the same or similar parts and/or structure. The discussion and description is of preferred specific embodiments of the new fluid pressure clutch with off-set means assembly of the invention, and it is to be understood that the discussion and description is not to unduly limit the scope of the invention.

Referring now to the drawings in detail, FIG. 1 of the drawings shows a housing 5 having an inside part 7 and an outside part 8 mountable around a power in-put shaft 9 by any suitable mounting means such as bolting, welding, and the like, but preferably by bolt means 11. The housing members are preferably cast of iron. The power in-put shaft 9 is rotatably mounted in the housing inside part 7 by bearing means. The bearings can be made out of any suitable bearing components such as bronze, wood, babbit, ball or roller bearings but preferably by roller bearings 13 complete with races 15 and seal means 17.

A clutch shaft 19 is rigidly mounted on the power in-put shaft 9, preferably by a key and key way combination 21, and secured thereto by a bolt 23, causing the clutch shaft 19 to rotate with the power shaft 9. The clutch shaft 19 has a pressure fluid conduit 25 along its longitudinal axis, a tapped tapered hole centered therein, and axial splines 27 around the outside.

A pressure fluid in-put shaft 29 has a tapered threaded boss 31 threadedly connecting the pressure in-put shaft 25 to the clutch hsaft 19 so it rotates therewith. A pressure fluid duct 33 is formed along a longitudinal axis of the fluid pressure in-put shaft 29.

Friction clutch plates are slidably mounted upon the clutch shaft 19 to rotate therewith, and they are two annular discs 35 having means 37 for engaging the splines 27 around the outside of the clutch shaft 19. Thrust springs 39 are mounted in the discs 35 by bolt means 41 and normally urge the discs 35 towards the released position. Clutch friction discs 43 are mounted by any suitable means such as riveting, bolting, and the like, but preferably by rivets, upon the annular clutch plates 35. These discs can be made of any suitable friction materials common to the art, fiber reinforced material being very satisfactory. Shown in the closed position is an expansible pressure fluid chamber 45. This chamber 45 is sealed by three O-rings 47. These rings can be made of any suitable material, but preferably of a rubber-like substance which has been found to effectively seal the fluid chamber 45. A power out-put element 49 is rotatably mounted on the clutch shaft 19 by bearing means. An outside portion 50 of said power out-put element 49 is mounted on same by bolt means 52. Element 50 is preferably finned. Any type of bearing can be employed such as bronze, babbit, roller, or ball bearing, or the like, but preferably by two ball bearing assemblies 51. Mounted on the power out-put element 49 is a driving means. This can be any suitable driving means such as a gear, flat pulley, V-belt pulley, chain sprocket, geared pulley, or the like, but preferably a geared pulley 53.

Radial intercommunicating duct means 55 are in the clutch shaft 19 communicating between the clutch shaft duct 25 and the pressure fluid chamber 45. In operation, pressure fluid is delivered through duct means 25, 33, and 55 into the pressure fluid chamber 45, and slides the clutch discs 35 apart so that the annular friction plates 43 engage the power out-put elements 49 and 50 to rotate same.

A power out-put shaft 57 is turnably mounted in the housings 7 and 8 by bearing means. These bearings can be any suitable means such as bronze, babbit, wood, plastic, roller, ball, or the like, but preferably roller bearings 59. Means are provided on the power out-put shaft 57 to drivingly connect the shaft 57 to a power driven means. Any suitable means can be used to connect the power out-put shaft 57 such as screw means, spline means, pulley, gear, key and key way means, or the like, but preferably by key way 61.

A driving means is rigidly mounted on the power out-put shaft 57 by any suitable means. The driving means can be any suitable means such as gears, flat pulley, V-belt pulley, gear pulley, or the like, but preferably is a geared pulley 63. The geared pulley 63 can be mounted upon said power out-put shaft 57 by any suitable means such as splines, pins, screws, key and key way or the like, but preferably by a key 67 engaging the key slot 69 and key way 71 in the pulley. Spacing rings or collars 72 are provided to center geared pulley 63 on shaft 57.

Suitable means are provided to connect geared pulley 53 and geared pulley 63. These can be drivingly connected by any suitable means such as the direct meshing of gears, by V-belts, flat belts, chains, geared chains, or the like, but preferably by a geared chain 77 drivingly connecting geared pulley 53 and geared pulley 63.

The outside portion of the housing 8 is secured to the inside portion 7 by any suitable means but preferably by bolt means 73.

A dust sealing ring 75 provides a seal between the rotating clutch power out-put element 49 and the outside part of the housing 8. This seal can be made of any suitable material such as fiber, plastic, or the like, but preferably of felt.

A dust cover 79 is provided as a dust seal between the fluid in-put shaft 29 and the clutch power out-put element 49.

The materials used in the forming of the specific embodiments of my invention can be of any suitable hard substance such as metal or plastic, but should be selected and formed in accordance with standard machining practice.

The foregoing discussion and description has been made in connection with preferred specific embodiments of the fluid pressure clutch means assembly of the invention. However, it is to be understood that the discussion and description is fully intended to illustrate and teach those skilled in the art how to practice the invention, and such is not to unduly limit the scope of the invention, which is defined in the claims set forth hereinafter.

I claim:

1. A fluid pressure-operated clutch with off-set drive mechanism comprising, a housing having an inside part rigidly mountable by bolt means around a power in-put shaft rotatable in respect to said housing, roller bearing means having races therewith and a seal means rotatably mounting said shaft in said housing, a clutch shaft keyed to said power in-put shaft and rigidly mounted thereon by screw means to rotate with said power in-put shaft, said clutch shaft having pressure fluid conduit means therein, axial splines around the outside and a tapped tapered hole centered on the longitudinal axis thereof, a pressure fluid in-put shaft having a tapered threaded boss connecting same to the said clutch shaft tapered hole by screw means to rotate therewith and a pressure fluid conduit means along its axis, friction clutch means mounted upon said clutch shaft to rotate therewith and having two annular discs engaging the said splines of said clutch shaft, annular friction means rigidly mounted on the outside of each of said discs, thrust spring means mounted in said discs normally urging said clutch means toward released position, an expansible pressure fluid chamber between said discs, annular rings between said discs and between said discs and said clutch shaft sealing said fluid chamber, a rotatable power out-put element having a geared pulley turnably mounted on said clutch shaft by ball bearing means, interconnecting duct means through said clutch shaft communicating between said pressure fluid conduit means and said pressure fluid chamber for delivering pressure fluid into said chamber to move the said discs and friction means against said rotatable power out-put element, a power out-put geared pulley rigidly mounted by key means on a power out-put shaft turnably mounted by ball bearing means in said housing, a geared chain on said geared pulley of said power out-put element of said clutch means drivingly connected to said power out-put geared pulley, and an outside part of said housing mounted on and connected to said inside part of said housing by screw means.

2. A fluid pressure-operated clutch comprising, a housing having an inside part rigidly mountable by bolt means around a power in-put shaft rotatable in respect to said housing, roller bearing means having races therewith and a seal means rotatably mounting said shaft in said housing, a clutch shaft keyed to said power in-put shaft and rigidly mounted thereon by screw means to rotate with said power in-put shaft, said clutch shaft having pressure fluid conduit means therein, axial splines around the outside and a tapped tapered hole centered on the longitudinal axis thereof, a pressure fluid in-put shaft having a tapered threaded boss connecting same to the said clutch shaft tapered hole by screw means to rotate therewith and a pressure fluid conduit means along its axis, friction clutch means mounted upon said clutch shaft to rotate therewith and having two annular discs engaging the said splines of said clutch shaft, annular friction means rigidly mounted on the outside of each of said discs, thrust spring means mounted in said discs normally urging said clutch means toward released position, an expansible pressure fluid chamber between said discs, annular rings between said discs and between said discs and said clutch shaft sealing said fluid chamber, a rotatable power out-put element having a geared pulley turnably mounted on said clutch shaft by ball bearing means, interconnecting duct means through said clutch shaft communicating between said pressure fluid conduit means and said pressure fluid chamber for delivering pressure fluid into said chamber to move the said discs and friction means against said rotatable power out-put element.

References Cited

UNITED STATES PATENTS

| | | | |
|---|---|---|---|
| 2,559,337 | 7/1951 | Balmforth | 192—87.19 |
| 2,656,905 | 10/1953 | Langdon | 192—85 |
| 3,021,932 | 2/1962 | Becknell | 192—85 |
| 3,036,681 | 5/1962 | Crosby | 192—85 |
| 3,135,289 | 6/1964 | Jordan | 192—85 |
| 3,199,646 | 8/1965 | McBride | 192—85 |
| 3,237,734 | 3/1966 | Jania | 192—85 |
| 3,237,737 | 3/1966 | Mamo | 192—85 |

FRED C. MATTERN, JR., *Primary Examiner.*

DAVID J. WILLIAMOWSKY, *Examiner.*

C. J. HUSAR, *Assistant Examiner.*